United States Patent Office 3,152,158
Patented Oct. 6, 1964

---

3,152,158
METHOD OF PREPARING TETRAKIS(TRIORGANOPHOSPHITE) NICKEL COMPOUNDS
Reginald F. Clark, Lake Charles, La., assignor to Cities Service Research and Development Company, New York, N.Y., a corporation of New Jersey
No Drawing. Filed Jan. 23, 1961, Ser. No. 83,875
18 Claims. (Cl. 260—439)

This invention is concerned with an improved method of preparing compounds of nickel. More specifically, the preparative method of this invention is concerned with the production of tetrakis(triorganophosphite) nickel compounds, and similar related compounds.

In brief, the process of this invention comprises the preparation of tetrakis(triorganophosphite) nickel compounds by the reaction of an organonickel compound, i.e., a compound containing an organic carbon to nickel bond, with the appropriate organophosphite compound. Other polysubstituted compounds may be prepared by the subject process.

Compounds to which the preparative method of the present invention is applicable are those compounds disclosed and claimed in Clark and Storrs co-pending U.S. application Serial No. 73,560, filed December 5, 1960. The preferred compounds of said co-pending application are of the general formula $Ni[P(OR_1)(OR_2)(OR_3)]_4$ wherein $R_1$, $R_2$, and $R_3$ are the same or different and represent an organic radical selected from the group consisting of alkyl, substituted alkyl, cycloalkyl, substituted cycloalkyl, aryl, substituted aryl and aralkyl.

As disclosed in the above-identified co-pending application, one general method of preparing these compounds is by a substitution type of reaction whereby one or a plurality of carbonyl groups from nickel tetracarbonyl or its mono-, di-, or tri-substituted derivatives are replaced by the appropriate organophosphite radical.

Although the above general method is an excellent method of preparing tetrakis(triorganophosphite) nickel compounds, it suffers several disadvantages, particularly when applied to the large scale production of the subject compounds. Among these disadvantages is the use of the low boiling highly toxic compound, nickel tetracarbonyl, the evolution of carbon monoxide gas, and the high reaction temperature 140° C. to 270° C. (usually above 180° C.) necessary to replace the final carbonyl group with the organophosphite grouping.

In the method of this invention these disadvantages are overcome by the use of a starting nickel compound which is not necessarily derived from nickel tetracarbonyl, thereby eliminating this toxic material from the reaction mixture and usually without the evolution of carbon monoxide, while permitting the use of lower reaction temperatures.

Essentially, this new method of preparing these tetrakis(triorganophosphite) nickel compounds consists of reacting an organonickel compound preferably selected from the group consisting of a cycloalkapolyene nickel, an alkyne nickel, a substituted alkene nickel and a cycloalkapolyene nickel carbonyl with the appropriate organophosphite compound of the formula $P(OR_1)(OR_2)(OR_3)$ wherein $R_1$, $R_2$, and $R_3$ have the values as set forth above. The steps of recovering the tetrakis(triorganophosphite) nickel compound so produced, or of directly using the unpurified reaction product, are then applicable.

The reaction conditions necessary to effect the reaction are varied. In their simplest form they consist of mixing the two reactants at room temperature and after the required time, usually several hours, terminating the reaction. Isolating the product may follow.

A clearer understanding of the new preparative method may be obtained from the examples given below, which disclose the presently preferred modes of carrying out this invention.

Example I

A mixture of 99 grams (0.32 mole) of triphenylphosphite and 5 grams (0.027 mole) of bis(cyclopentadienyl) nickel was stirred at room temperature for twelve hours under an atmosphere of argon. At the end of this time, 150 ml. of methanol was added to the reaction mixture and the white solid which precipitated was separated. Upon recrystallization of the solid from tetrahydrofuran, 34 grams (0.0267 mole, 97% yield) of white solid tetrakis(triphenylphosphite) nickel, melting point 146–148° C. was obtained.

Example II

A reaction mixture consisting of 50 grams (0.12 mole) of tri(2-ethylhexyl)phosphite and 5 grams (0.027 mole) of bis(cyclopentadienyl) nickel was heated (35° C.) in an inert atmosphere (argon) for a period of twelve hours. Upon completion of the reaction period, the dark brown reaction mixture was poured into 65 ml. of methanol and the solid separated. The cream colored crystals were recrystallized from methanolic benzene. Twenty-five grams (0.0775 mole, 65% yield) of white crystalline, tetrakis[tri(2-ethylhexyl)phosphite] nickel, melting point 112–115° C. was obtained.

Example III

Bis(cyclopentadienyl) nickel (3.0 grams) and tri(p-methoxyphenyl)phosphite 25.0 grams) were placed in a 250 ml. flask and the stirred mixture was heated for one hour at 55–60° C. Cyclohexane (100 ml.) was added to the above reaction mixture and stirring continued for an additional hour. The cyclohexane was removed by vacuum and methanol (100 ml.) was added to the solid material. The solid material was filtered from the methanol and dissolved in benzene. The benzene solution was treated with charcoal and the benzene removed at reduced pressure. A 50% yield of white crystalline tetrakis[tri(p - methoxyphenyl)phosphite]nickel, melting point 134–138° C. was obtained.

The use of other organophosphites, such as tri(p-tolyl) phosphite, and tri(2-chloroethyl)phosphite in the process of Example III resulted in the formation of good yields of the corresponding tetrakis[triorganophosphite]nickel compounds; tetrakis[tri(p-tolyl)phosphite]nickel (23% yield) and tetrakis[tri(2-chloroethyl)phosphite] nickel (33% yield).

Example IV

Thirty-three grams of triphenylphosphite was added to a solution of 5.0 grams of bis(cyclopentadienyl)nickel in 25 grams of cyclohexane contained in a 250 ml. flask. The flask had previously been flushed with argon and the reaction mixture was maintained in an atmosphere of argon throughout the reaction. The reaction mixture was gently refluxed and stirred for a period of one hour and then a solution of 33 grams of triphenylphosphite in 30 grams of cyclohexane was added. Refluxing and stirring were continued for an additional three hours. The solid product was separated from the reaction mixture and washed with three small portions of n-pentane. After drying, 28 grams of crystalline tetrakis(triphenylphosphite)nickel was obtained. An additional 3.7 grams of product was obtained by concentration of the pentane wash, thus a total of 31.7 grams (92.2% yield) of product was obtained.

When other organonickel compounds, such as bis(methylcyclopentadienyl)nickel, bis(indenyl) nickel, bis(cyclopentadienylnickel) tolan, bis(acrylonitrile) nickel, bis(acrolein) nickel and bis(cyclopentadienylnickel) dicarbonyl are used instead of bis(cyclopentadienyl) nickel in the process of Example IV appreciable yields of the corresponding tetrakis(triorganophosphite) nickel compounds are obtained.

The triorganophosphites suitable for use in this reaction are those of the general formula P(OR$_1$)(OR$_2$)(OR$_3$) where R$_1$, R$_2$, and R$_3$ have the same or different meanings and represent a member selected from the group consisting of alkyl, substituted alkyl, cycloalkyl, substituted cycloalkyl, aryl, substituted aryl and aralkyl.

Suitable alkyl radicals for use in this invention are those such as methyl, ethyl, propyl, n-butyl, sec-butyl, tert-butyl, amyl, isoamyl, hexyl, heptyl, octyl, isooctyl, dodecyl and octadecyl. Substituted alkyl radicals such as acetonyl, acetoxy, methoxymethyl, anisyl, phenacyl, salicyl, methoxyethyl, and 2-chloroethyl may be used.

Representative cycloalkyl and substituted cycloalkyl radicals which may be used for the R values include cyclopropyl, cyclobutyl, cyclopentyl, cyclohexyl, cyclooctyl, 1,4-dimethylcyclohexyl and 3,5-dimethylcyclooctyl, 3-methoxycyclopentyl, and 4-bromocyclohexyl.

Aryl radicals which are useful for the triorganophosphite compound include phenyl, biphenyl, α-naphthyl, β-naphthyl, and α-anthryl. Useful substituted aryl radicals include tolyl, xylyl, α-mesityl, duryl, cumenyl, desyl, p-acetophenyl, p-chlorophenyl, and m-(trifluoromethyl) phenyl.

Aralkyl radicals useful for values of R include benzyl, phenethyl, m-tolylmethyl, p-tolylethyl, 3-phenyl-1-propyl and β-naphthylmethyl.

The term "organonickel compound" as used here and in the appended claims is used in the sense of a compound containing at least one nickel to organic carbon bond or a nickel atom bonded directly to a carbon atom wherein said carbon is further bonded to additional carbon atoms and/or hydrogens. Thus, according to this definition, carbon containing groups such as cyanide (—CN), carbonyl (=CO), thiocyanate (—CNS), carbonate, etc., are not considered as containing an organic carbon atom, and nickel bonded only to such groups would not be an organonickel compound.

It is of interest to note that in the organonickel compounds, nickel may exist in a variety of different formal valence states, varying from a formal valence of three in some compounds, such as bis(cyclopentadienyl) nickel picrate, [(C$_5$H$_5$)$_2$Ni(C$_6$H$_2$N$_3$O$_7$)], to a formal valence of zero in biscyclopentadiene nickel (O), [(C$_5$H$_6$)$_2$Ni]. Obviously, the nature of the constitution of these compounds is not wholly dependent upon the formal valence of the nickel atom, but also may depend upon the secondary valence of the nickel atom.

The term "cycloalkapolyene nickel compounds" as used here and in the appended claims defines organonickel compounds derived from the interaction of a cycloalkpolyene and nickel or a nickel compound. Suitable cycloalkylpolyenes include stable cyclobutadiene compounds, cyclopentadienes, cyclooctadienes, cyclooctatetraenes and cyclododecatrienes. Specific examples thereof and references to methods of preparing these compounds include, tetramethylcyclobutadiene nickel dichloride (C$_8$H$_{12}$NiCl$_2$) [Criegee and Schroder, Angew. Chem. 71, 70 (1959)]; cyclododecatriene nickel (C$_{12}$H$_{18}$Ni) [Wilke, Angew. Chem. 72, 581 (1960)]; biscyclooctadiene nickel [(C$_8$H$_{12}$)$_2$Ni] (Wilke, ibid.); cyclooctatetraene nickel [(C$_8$H$_8$Ni)$_x$] (Wilke, ibid.); and biscyclopentadiene nickel [C$_5$H$_6$)$_2$Ni] [Fischer and Werner, Ber. 92, 1423 (1959)].

Cyclopentadienyl nickel and the various substituted cyclopentadienyl nickel compounds comprise a large subgroup of cycloalkapolyene nickel compounds suitable as the organonickel compounds. A few specific examples and references include, bis-cyclopentadienyl nickel (Thomas, U.S. Patent 2,680,758); bis(methylcyclopentadienyl)nickel (Lundstrom and Barush, U.S. Patent 2,862,945); bis(3-methyl-1-isopropyl-1,3-cyclopentadienyl)nickel (Lundstrom and Barush, ibid.); bis(indenyl) nickel [Fischer, Sens and Jira, Z. Naturforsch. 86, 692 (1953)]; bis(cyclopentadienyl)nickel hexamine

[C$_5$H$_5$)$_2$Ni(NH$_3$)$_6$]

[Fischer and Jira, Z. Naturforsch. 86, 217 (1953)]; cyclopentadienylnitrosyl nickel [(C$_5$H$_5$NiNO] [Piper, Cotton, Wilkinson, J. Inorg. Nuclear Chem. 1, 165 (1955)]; bis-cyclopentadienyl nickel nitrate [(C$_5$H$_5$)$_2$NiNO$_3$)] [Wilkinson, Cotton, Fischer, Down and Moore, Paper 133, ACS Meeting (1958)]; bis(cyclopentadienyl) nickel tribromide [(C$_5$H$_5$)$_2$NiBr$_3$] [Fischer and Jira, Z. Naturforsch. 86, 217 (1953)]; 5-cyclopentadienyl-5-one pentanoic acid nickel nitrosyl (Kozekowski, U.S. Patent 2,916,503); bis(α-hydroxethylcyclopentadienyl)nickel (Haven, U.S. Patent 2,810,737); bis(1-hydroxy-3-benzylcyclopentadienyl) nickel (Benson, U.S. Patent 2,849,470); cyclopentadienyl (tetrachloropentanyl) nickel (Kaufman, U.S. Patent 2,922,805); cyclopentadienyl(dibromocyclopentyl) nickel (Kaufman, ibid.).

The term "alkyne nickel compounds" is used here and in the appended claims as defining an organonickel compound derived from the interaction of an alkyne with nickel or a nickel compound. Some specific examples, and references to compounds comprising this class, include bis(cyclopentadienylnickel) acetylene [Dubeck, J. Am. Chem. Soc. 82 (1960)]; bis(cyclopentadienyl-nickel)-phenylacetylene [Tinley, Bassett and Milk, J. Am. Chem. Soc. 81, 4757 (1959)]; bis(cyclopentadienyl-nickel)-tolan [ibid.]; and bis(cyclopentadienylnickel)-hexyne-3 [ibid.].

The term "substituted alkene nickel compound" is used here and in the appended claims to define an organonickel compound derived from the interaction of nickel or a nickel compound with an alkene substituted in the α-position with an inert strongly electronegative grouping such as cyano (—CN), aldehyde (—CHO), etc. Such compounds and methods for their preparation are disclosed by Schranger [J. Am. Chem. Soc. 81, 5310 (1959) and J. Am. Chem. Soc. 82, 1008 (1960)]. Specific examples include bisacrylonitrile nickel, bisacrolein nickel, biscinnamonitrile nickel, and bisfumaronitrile nickel.

The term "cycloalkapolyene nickel carbonyl compound" is used here and in the appended claims to define an organonickel compound wherein in addition to a cycloalkapolyene group being bonded to a nickel atom there is also one or a plurality of carbonyl groups bonded to the nickel. Such compounds are disclosed by Fischer and Palm, Ber. 91, 1725 (1958); Thomas, U.S. Patent 2,849,471; and Brown, Shapiro and De Witt, U.S. Patent No. 2,818,416. Specific examples include bis(cyclopentadienyl) nickel tetracarbonyl, ethylcyclopentadienyl nickel dicarbonyl bromide, tris(cyclopentadienylnickel) dicarbonyl, and 3-phenylindenyl nickel dicarbonyl bromide.

As shown in the preceding examples the reaction in its simplest form may be effected without the use of solvents, or of external heating or cooling. However in some cases it is necessary to employ these means to modify the speed of the reaction, increase the yield of desired product or permit a more uniform reaction. Thus, reaction temperatures in the range of 0° C. to 200° C. may be employed; preferably the range of reaction temperatures is 20° C. to 100° C. Solvents which may be used include, in addition to or at least partially in place of an excess of the triorganophosphite, inert organic solvents of suitable melting and boiling points, such as benzene, toluene, n-hexane, pentane, cyclohexane, ethylcyclohexane, methylcyclohexane and petroleum naphtha.

It has also been found desirable to blanket the reactor with an inert gas, such as nitrogen or argon, since the presence of more than minute quantities of oxygen apparently tends to accelerate the decomposition of the complex product.

The bonding of the compound produced by means of the reaction of this invention is believed to be entirely a coordination bonding system; thus the nickel atom of these compounds has a formal valence of zero. In the organonickel compounds useful as starting materials, the nickel may have a variety of formal valences as pointed out above. Therefore, in order to insure good yields of pure material it may be desirable to employ a suitable reducing agent. Preferably an excess over the stoichiometric amount of triorganophosphite is used and this excess presumably functions as a suitable reducing agent. The amount of excess triorganophosphite used will, of course, depend upon several factors, such as the formal valence of the nickel in the reactant compound and whether or not the phosphite compound is employed also as a solvent for the reaction mixture. It is also contemplated that an external reducing agent could be added to the reaction mixture, thus decreasing the excess of triorganophosphite needed, as described in the copending application of Clark et al., Serial No. 129,968, filed August 8, 1961. When an organonickel compound is used wherein nickel has a formal valence of zero, it is not essential to employ a large excess of triorganophosphite to function solely as a reducing agent.

A stoichiometric excess of from about 75% to about 300% of triorganophosphite has been found to be the preferred range when an organonickel compound, wherein the nickel has a formal valence of 2, is used. This range of excess triorganophosphite compound may be from about 25% to about 350% when the formal valence of the nickel in the reactant is varied from zero to three. The excess unreacted triorganophosphite may of course, be recovered and reused in subsequent preparations.

It is to be understood that by advancing the foregoing theory, regarding reduction of the nickel by the organophosphite, it is not intended that the invention be limited to such theory.

The tetrakis(triorganophosphite) nickel compounds prepared by the method of this invention have been found useful for catalyzing many organic reactions, especially addition-type polymerization reactions. The compounds have been found to be extremely effective for producing cyclic polymers of conjugated diolefins, especially the cyclization of 1,3-butadiene. The utility of these tetrakis (triorganophosphite) nickel compounds is discussed more fully in Clark and Storrs co-pending U.S. application Serial No. 73,560, filed December 5, 1960.

Group VIII transition metals other than nickel, particularly platinum and palladium, having a maximum coordination number of four, are capable of forming organometallic compounds and also have the capacity for associating with or being bonded to neutral molecules such as carbon monoxide, said association or bonding being by coordination bonds. The individual metals have their own numerical coordination valences, which may be repesented by the symbol "$x$." In place of the phosphites, phosphine ligands are useful. Also, similar arsenic and antimony compounds may be used. The P, As, or Sb organo compounds may be represented by the symbol Z. The latter elements are group VB elements having an atomic weight between about 30 and about 122.

Thus, in its broader aspects, the invention is not limited to the preparation of the preferred tetrakis (triorganophosphite) nickel compounds, and compounds of the formula [$(RO_a)_3Z]_xM$ wherein "Z" and "$x$" have the foregoing significance, "M" is a metal selected from the group consisting of Ni, Pt, and Pd, and "$a$" is one or zero, are within the invention. Preferably "$a$" is one; that is, the phosphite, arsenite, and antimonite ligands are preferred to the phosphine, arsine, and stibine ligands. In some cases, the ligands less likely to involve excessive steric hindrance or other undesirable effects are preferred; for instance the use of triphenyl phosphite or trimethyl phosphine is preferred to the use of triphenyl phosphine.

Also useful, but not presently included within the appended claims, are other Group VIII transition metal organo compounds, in place of the similar compounds of nickel including Ir, Ru, Rh, Fe, Co, and Os, all of which have coordination numbers of five in compounds wherein these metals have an ionic or formal valence state of zero. With these metals, five bulky ligands such as triphenylphosphine are not readily associated with said metals. The procedure of Clark and Storrs application S.N. 73,560, filed December 5, 1960, is of interest in this regard. In that application, the discovery is set forth that when a metal carbonyl such as nickel carbonyl or a partially substituted metal carbonyl, such as triphenylphosphite nickel tricarbonyl, bis(triphenylphosphite) nickel dicarbonyl, or tris(triphenylphosphite) nickel monocarbonyl is reacted with the desired ligand such as triphenylphosphite under certain conditions, the result is the production of a new class of compounds, e.g., tetrakis(triphenylphosphite) nickel. That process may be used with the carbonyls and partially substituted carbonyls of any of the Group VIII transition metals set forth herein, with suitably selected ligands. With the metals having a coordination valence of five, the use of bulky ligands such as triphenylphosphine apparently involves excessive steric hindrance, and/or other effects, with the result that compounds not desired according to the present invention, similar to [$(C_6H_5)_3P]_2Fe(CO)_3$ are obtained. Similar difficulties are encountered using the organometallic compounds of the present invention wherein more than four coordination valences are involved. On the other hand, less bulky groups such as trimethyl phosphite or other alkyl radical-containing ligands are of benefit in obtaining fully substituted derivatives or substantially fully substituted derivatives of the metal having a maximum coordination valence of more than four. Even with the metals Ni, Pt, and Pd, the ligands containing phosphorous, arsenic, and antimony are preferably selected on the basis of well known principles of chemistry so that the molecular configuration of the ligands does not involve possibly undesirable effects such as excessive steric hindrance. The particular Group VB element used, and the presence or absence of oxygen between the organic radicals and said element, also enter into this consideration.

In the case of the specified transition metals other than nickel, the organometal compounds which are useful as starting materials are similar to the specific organonickel compounds described above. That is, the metal atom is bonded directly to at least one carbon atom, said carbon atom in turn being bonded to hydrogen or one or more additional carbon atoms. As is noted above, the definition for "organo compounds of phosphorous, arsenic, and antimony" is inclusive of the phosphites, arsenites and antimonites, which may also be referred to as organooxy compounds of these elements.

The invention is not to be limited by hypotheses or theories incorporated in the above description. Thus, the reference to "steric hindrance" is given by way of a possible explanation of the principles and mechanisms involved, and it is to be understood that the phenomena noted may have other causative factors.

I claim:

1. A method of preparing a tetrakis (triorganophosphite) nickel compound of the formula $Ni[P(OR_1)(OR_2)(OR_3)]_4$ wherein $R_1$, $R_2$, and $R_3$ represent an organic radical selected from the group consisting of alkyl, substituted alkyl, cycloalkyl, substituted cycloalkyl, aryl substituted aryl and aralkyl, which comprises reacting an organonickel compound with a triorganophosphite compound of the formula, $P(OR_1)(OR_2)(OR_3)$ wherein $R_1$, $R_2$, and $R_3$ have the representation as set forth above.

2. A method of preparing a tetrakis (triorganophosphite) nickel compound of the formula, $Ni[P(OR_1)(OR_2)(OR_3)]_4$ wherein $R_1$, $R_2$, and $R_3$ represent an organic radical selected from the group consisting of alkyl, substituted alkyl, cycloalkyl, substituted cycloalkyl, aryl, substituted aryl and aralkyl, which comprises reacting an organonickel compound selected from the group consisting of a cycloalkapolyene nickel compound, an alkyne nickel compound, a substituted alkene nickel compound, and a cycloalkapolyene nickel carbonyl compound, with a triorganophosphite compound of the formula $$P(OR_2)(OR_2)(OR_3)$$

wherein $R_1$, $R_2$, and $R_3$ have the representation as set forth above.

3. A method of preparing a tetrakis (triorganophosphite) nickel compound of the formula $Ni[P(OR_1)(OR_2)(OR_3)]_4$ wherein $R_1$, $R_2$, and $R_3$ represent an organic radical selected from the group consisting of alkyl, substituted alkyl, cycloalkyl, substituted cycloalkyl, aryl, substituted aryl and aralkyl, which comprises reacting a cycloalkapolyene nickel compound with a triorganophosphite compound of the formula $P(OR_1)(OR_2)(OR_3)$ wherein $R_1$, $R_2$, and $R_3$ have the representation as set forth above.

4. The process of claim 3, wherein the organonickel compound is bis(cyclopentadienyl) nickel.

5. The process of claim 3, wherein the organonickel compound is bis(indenyl) nickel.

6. The process of claim 3, wherein the organonickel compound is bis(methylcyclopentadienyl) nickel.

7. The process of claim 3, wherein the organonickel compound is bis(cyclopentadienylnickel) acetylene.

8. The process of claim 3, wherein the organonickel compound is bis(cyclopentadienylnickel) tolan.

9. The process of claim 3, wherein the organonickel compound is bis(cyclopentadienylnickel) phenylacetylene.

10. The process of claim 3, wherein the organonickel compound is bis(acrylonitrile) nickel.

11. The process of claim 3, wherein the organonickel compound is bis(acrolein) nickel.

12. The process of claim 3, wherein the organonickel compound is ethylcyclopentadienylnickel dicarbonyl bromide.

13. The process of claim 3, wherein the organonickel compound is (cyclopentadienylnickel) dicarbonyl.

14. A method of preparing a tetrakis(triorganophosphite) nickel compound of the formula $$Ni[P(OR_1)(OR_2)(OR_3)]_4$$

wherein $R_1$, $R_2$, and $R_3$ represent an organic radical selected from the group consisting of alkyl, substituted alkyl, cycloalkyl, substituted cycloalkyl, aryl, substituted aryl and aralkyl, which comprises reacting an alkyne nickel compound with a triorganophosphite compound of the formula $P(OR_1)(OR_2)(OR_3)$ wherein $R_1$, $R_2$, and $R_3$ have the representation as set forth above.

15. A method of preparing a tetrakis (triorganophosphite) nickel compound of the formula $$Ni[P(OR_1)(OR_2)(OR_3)]_4$$

wherein $R_1$, $R_2$, and $R_3$ represent an organic radical selected from the group consisting of alkyl, substituted alkyl, cycloalkyl, substituted cycloalkyl, aryl, substituted aryl and aralkyl, which comprises reacting a substituted alkene nickel compound with a triorganophosphite compound of the formula $P(OR_1)(OR_2)(OR_3)$ wherein $R_1$, $R_2$, and $R_3$ have the representation as set forth above.

16. A method of preparing a tetrakis (triorganophosphite) nickel compound of the formula $$Ni[P(OR_1)(OR_2)(OR_3)]_4$$

wherein $R_1$, $R_2$, and $R_3$ represent an organic radical selected from the group consisting of alkyl, substituted alkyl, cycloalkyl, substituted cycloalkyl, aryl, substituted aryl and aralkyl which comprises reacting a cycloalkapolyene nickel carbonyl with a triorganophosphite compound of the formula $P(OR_1)(OR_2)(OR_3)$ wherein $R_1$, $R_2$, and $R_3$ have the representation as set forth above.

17. A method of preparing compounds of the formula, $[(RO_a)_3Z]_4M$ wherein M is a Group VIII metal selected from the group consisting of nickel, platinum and palladium, Z is a member selected from the group consisting of phosphorus, arsenic and antimony, "$a$" is a member selected from the group consisting of 0 and 1, and R is an organic radical selected from the group consisting of alkyl, substituted alkyl, cycloalkyl, substituted cycloalkyl, aryl, substituted aryl and aralky, which comprises interacting an organometallic compound of said metal M with a ligand-forming compound of the formula $(RO_a)_3Z$, wherein R, $a$, and Z have the representation set forth above.

18. The process of claim 17, wherein said Group VIII metal is nickel.

References Cited in the file of this patent

UNITED STATES PATENTS 2,818,416     Brown et al. _____ Dec. 31, 1957

OTHER REFERENCES

Malatesta: Annali di Chimica (Italy), vol. 44, No. 1–6 (1954) (QDIA68).

Malatesta et al.: Journal of Chemical Society (1957), pp. 1186–1188.

UNITED STATES PATENT OFFICE
CERTIFICATE OF CORRECTION

Patent No. 3,152,158            October 6, 1964

Reginald F. Clark

It is hereby certified that error appears in the above numbered patent requiring correction and that the said Letters Patent should read as corrected below.

Column 6, line 64, after "aryl" insert a comma; column 7, line 5, for "$P(OR_2)(OR_2)(OR_3)$" read -- $P(OR_1)(OR_2)(OR_3)$ --; same column 7, lines 19, 21, 23, 25, 27, 29, 32, 34, 36 and 39, for the claim reference numeral "3", each occurrence, read -- 2 --; column 8, line 32, for "aralky" read -- aralkyl --.

Signed and sealed this 28th day of September 1965.

(SEAL)
Attest:

ERNEST W. SWIDER             EDWARD J. BRENNER
Attesting Officer            Commissioner of Patents